United States Patent [19]

Chamberlain

[11] 3,999,462
[45] Dec. 28, 1976

[54] BRAKE DELAY VALVE

[75] Inventor: Richard W. Chamberlain, Aurora, Ill.

[73] Assignee: Caterpillar Tractor Co., Peoria, Ill.

[22] Filed: Dec. 3, 1973

[21] Appl. No.: 421,064

[52] U.S. Cl. .................................... 91/29; 91/443; 91/447; 91/468; 137/599; 192/4 A; 303/72

[51] Int. Cl.[2] .................. F15B 11/08; F15B 13/042

[58] Field of Search ............ 91/443, 468, 446, 432, 91/451, 452, 29, 31, 447; 137/599; 303/72, 74; 192/4 A

[56] References Cited

UNITED STATES PATENTS

| 853,673 | 5/1907 | Bickel | 303/72 |
|---|---|---|---|
| 1,185,034 | 5/1916 | Werner | 91/443 |
| 1,575,820 | 3/1926 | Cloud | 303/74 |
| 1,789,750 | 1/1931 | Hildebrand | 303/74 |
| 2,495,785 | 1/1950 | Stephens | 91/443 X |
| 3,181,667 | 5/1965 | Lohbauer | 192/4 A |
| 3,429,620 | 2/1969 | Scott | 303/74 X |
| 3,583,422 | 6/1971 | Dach et al. | 137/116.3 |

*Primary Examiner*—Irwin C. Cohen
*Attorney, Agent, or Firm*—Phillips, Moore, Weissenberger, Lempio & Strabala

[57] ABSTRACT

A valve is used in a system employed on a vehicle for effecting the selected automatic disengagement of the transmission or main clutch upon the application of the vehicle service brakes, as well as the reengagement of the transmission when the brakes are released. Such valve allows rapid pressure buildup to the brakes, so that they may be rapidly applied, but delays the release of the brakes to allow ample time for reengagement of the transmission.

1 Claim, 4 Drawing Figures

BRAKE DELAY VALVE

BACKGROUND OF THE INVENTION

This invention relates to a valve which delays the release of brakes, and more particularly, to such a valve for use in a system for effecting automatic disengagement of a transmission upon the application of the brakes, and reengagement of the transmission upon release of the brakes.

In conventional loader vehicles, an engine is employed to power the vehicle for movement from place to place and also to provide power, often through hydraulic pumps, to raise and manipulate a bucket or other implement carried by the vehicle. It has been recognized as desirable to employ a system which provides a connection between the service brakes and the transmission of the vehicle to neutralize the transmission automatically upon actuation of the brakes. This has the advantage of freeing the hands of the operator to manipulate the bucket controls, instead of actuating a transmission or clutch lever, and also insures availability of the full power of the engine for manipulating the bucket without delay.

A disadvantage of many prior devices for this purpose is that a brief period occurs in which a clutch or transmission remains disengaged after the brakes are released, due to the difference between the time required to reengage the transmission and the time required to release the brakes. This makes it difficult to properly position the implement and may present a dangerous situation, particularly when operating on a slope, because the vehicle is momentarily free to coast.

The systems disclosed in U.S. Pat. No. 3,050,165 to Day et al, and U.S. Pat. No. 3,181,667 to Lohbauer et al provide systems which include means for delaying the release of the brakes thereof until the transmission is reengaged. Such metering techniques as disclosed therein have been found acceptable in a system wherein a relatively large amount of fluid is returned upon the release of the brakes, i.e., for example, when the system utilizes drum-type brakes. However, with vehicles using brake systems which return a relatively small amount of fluid upon the release of the brakes, i.e., for example in vehicles using caliper disc-type brakes, such small amounts of fluid returned from the brakes results in the fact that the systems of such two patents do not reliably control the delay properly to insure full engagement of the transmission.

U.S. Pat. No. 3,583,422 to Dach et al, and U.S. Pat. No. 3,626,968 to Hancock disclose brake valves which delay the application of the brakes, but allow relatively free release thereof. Thus, these patents are cited as of general interest.

SUMMARY OF THE INVENTION

It is an object of this invention to provide a valve used in combination with fluid actuated brakes, such valve allowing relatively rapid application of the brakes by application of fluid pressure therethrough, but delaying the release of fluid pressure from said brakes, so as to delay the release of the brakes.

It is a further object of this invention to provide a valve which, while fulfilling the above object, may be used in a system providing for disengagement of a transmission upon application of the brakes, and reengagement of the transmission upon release of the brakes.

It is a still further object of this invention to provide a valve which, while fulfilling the above objects, is simple in design and effective in use.

Broadly stated, the invention is a control device in combination with means for increasing fluid pressure supplied to the device and means for releasing the fluid pressure from the device, and a load responsive to application of fluid pressure to the load and release of fluid pressure from the load. The device comprises means for providing a relatively rapid increase in fluid pressure applied to the load upon an increase in fluid pressure supplied to the device. The device further comprises means for allowing relatively rapid initial release of the pressure applied to the load to a predetermined pressure level, and for providing relatively less rapid release of the pressure applied to the load after the initial release of the pressure to the predetermined pressure level, upon release of fluid pressure from the device.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
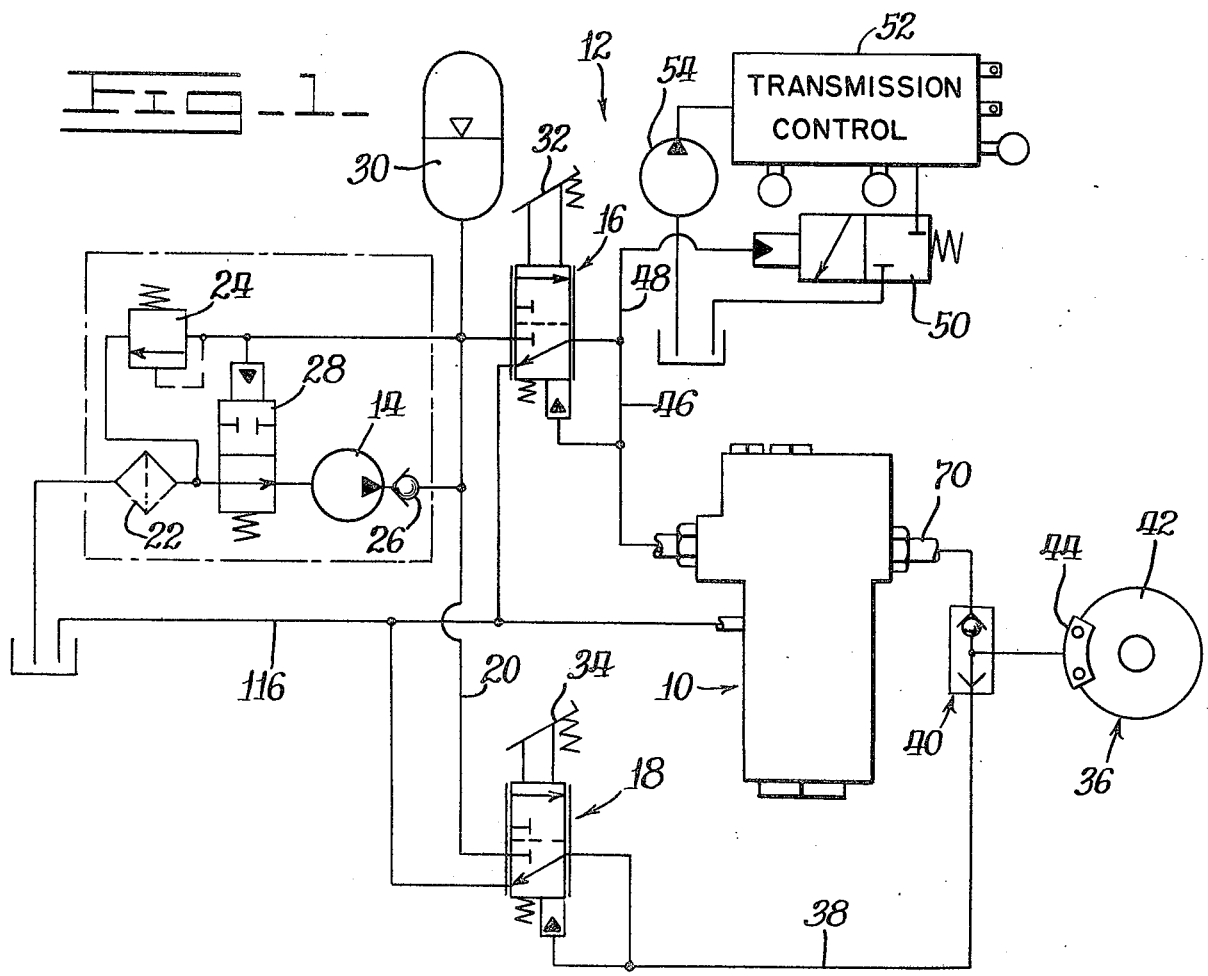
FIG. 1 is a schematic illustration of a brake system incorporating the invention.

Referring to the drawings, a brake delay valve is generally indicated at 10 in association with a system 12 for automatically neutralizing a vehicle transmission upon application of the brakes. The system 12, schematically shown in FIG. 1, includes a pump 14 for supplying hydraulic fluid from a tank to a pair of brake control valves 16, 18 through a conduit 20. Integral with the pump 14 is a screen filter 22, a relief valve 24, a check valve 26, and an unloading valve 28 for customary purposes well known in the art. An accumulator 30, disposed between the pump 14 and the brake valves 16, 18, cooperates with the unloading valve 28 to maintain and control an acceptable pressure level in the system 12.

Each brake control valve 16,18 is a conventional, infinitely positioning 3-way valve which is spring biased to the "off" position. The valves 16,18 are separately manually operated by left and right brake pedals 32,34 respectively. Operation of the right brake pedal 34 directs fluid pressure to the vehicle's service brakes, one of which is shown at 36, through a conduit 38 and double check valve 40 having a reciprocating ball check. Service brake 36 is of a conventional design wherein a disc 42 mounted to the vehicle axle, not shown, is gripped by a caliper brake assembly 44 secured to the vehicle.

Actuation of the left brake pedal 32, however, increasingly directs fluid pressure through a conduit 46 to the subject brake delay valve 10 which will be described below and through a branch conduit 48 to actuate a transmission neutralizing valve 50 which is normally spring biased to the "off" position. When actuated, the neutralizer valve 50 dumps fluid pressure being supplied to a transmission control 52 from a pump 54 which neutralizes the vehicle transmission in a manner well known to those skilled in the art.

Figure 2:
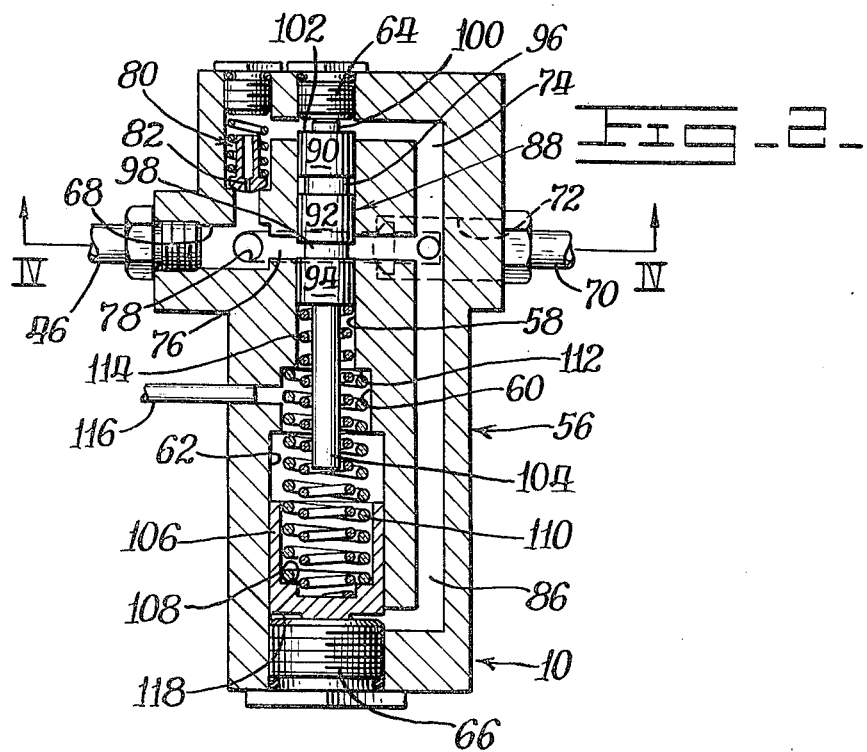
FIG. 2 is a sectional elevation of the valve incorporated in the system of FIG. 1, with the valve in a first state of operation.
Figure 3:
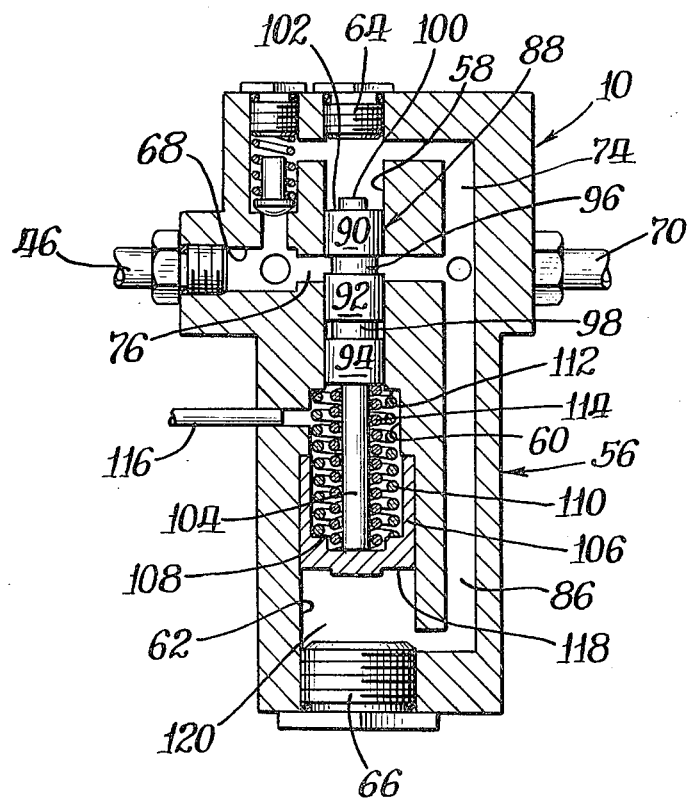
FIG. 3 is a sectional elevation similar to that shown in FIG. 2, but showing the valve in a second state of operation.
Figure 4:
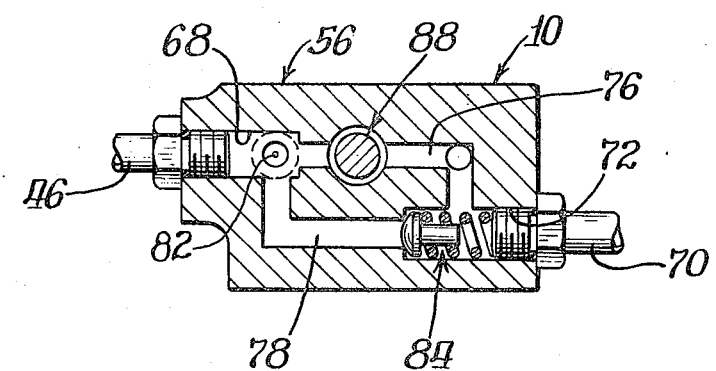
FIG. 4 is a sectional view taken along the line IV—IV of FIG. 2.

As shown in FIGS. 2–4, the brake delay valve 10 includes a valve body or housing 56 having a plurality of progressively larger, concentrically stepped bores 58,60,62, the open ends of which are closed by plugs 64,66. Fluid pressure in conduit 46 enters the valve body 56 through an inlet port 68 and is discharged through a conduit 70 from an outlet port 72. Fluid pressure in conduit 70 shifts the ball check of the double check valve 40 to block conduit 38 so that the pressure is directed to the brakes 36 for the actuation thereof. Fluid pressure is communicated between the inlet and outlet ports 68,72 to any of three passages 74,76,78 formed in the valve body 56. The first passage 74 is disposed in the valve body 56 such that it is intersected by the outward end of the bore 58. A check valve 80 having an orifice 82 is disposed within the passage 74 between the inlet port 68 and the intersection with bore 58. The second passage 76 is disposed within the valve body 56 such that it is intersected by the bore 58 at an intermediate position thereof. As best shown in FIG. 4, the third passage 78 bypasses the bore 58 and provides a more direct route between the ports 68,72. A check valve 84 is disposed in passage 78 to prevent the return of fluid therethrough. The valve body 56 further includes a fourth passage 86 which communicates fluid pressure at the outlet port 72 to the outward end of the bore 62.

A valve spool 88 is slidably disposed within the bore 58 of the valve body 56. The spool 88 includes three spaced lands 90,92,94 having annular recesses 96,98 disposed therebetween. A reduced diameter portion 100 is formed on the outward end of the spool 88 to prevent the land 90 from blocking the passage 74 and permit pressure therein to be exerted on the outward end face 102 of the spool. An elongated stop member 104 is formed on the inward end of the spool 88 and extends into bores 60,62.

A piston 106 is slidably disposed within the bore 62 and has an inwardly opening recess 108 receiving one end of a biasing spring 110 therein. The opposite end of the spring 110 seats on a stepped shoulder 112 defined by valve body 56 between bores 58,60. A smaller diameter spring 114 is disposed inside spring 110 and about the elongated stop member 104 of the spool 88. One end of the spring 114 engages the piston 106 and the other end engages the inward end of the spool 88. The springs 110,114 are active in urging the spool 88 and piston 106 apart and toward the opposite outward ends of their respective bores.

A drain line 116 communicates the intermediate bore 60 and adjacent portions of bores 58,62 to tank to prevent a pressure buildup between the spool 88 and piston 106 due to leakage thereby.

In describing the operation of the system, three fluid pressures, denoted as neutralizer valve actuating pressure, holding pressure, and braking pressure are significant to such system in which the brake delay valve 10 is contained. The neutralizer actuating pressure is the pressure at which the transmission neutralizer valve 50 shifts to neutralize the transmission. Such a pressure is selected to be well below the other two pressures mentioned above for insuring the actuation of the neutralizing valve 50 upon every brake actuation sequence through the use of pedal 32. However, it should be noted that this pressure is significant only in the actuation sequence and is not relevant in the deactuation sequence because of the immediate release of pressure from the neutralizer valve actuator to tank pressure upon release of such pedal 32.

The holding pressure denotes a range of intermediate fluid pressures which are sufficient to hold the vehicle at rest. As such holding pressure bleeds down through orifice 82, the springs 110 and 114 are designed to urge the piston 106 and spool 88 outwardly in a sequential manner, as will be hereinafter described.

The braking pressure denotes a range of high fluid pressures which are required to stop the vehicle when it is in motion. Such a range is normally above the holding pressure range.

In operation, it will be seen that the manipulation of the brake pedal 34 will actuate the brake control valve 18 to direct fluid pressure from the pump 14 to the double check valve 40 to the service brakes 36 in a conventional manner without any effect on the vehicle transmission. Manipulation of the brake pedal 32, however, directs fluid pressure in the braking pressure range to both the service brakes 36 and the transmission neutralizer valve 50. Because the fluid pressure applied is in the high braking pressure range, such pressure is sufficient to shift the neutralizer valve to neutralize the transmission. Pressure conducted from the brake control valve 16 is communicated to the service brakes 36 via conduit 46, brake delay valve 10, conduit 70, and double check valve 40.

To avoid any delay in the application of the brakes by the communication of the fluid pressure to the brake delay valve 10, three flow paths, i.e., passages 74,76,78, are provided through the valve body 56 so as not to restrict the flow of braking pressure to the brakes. Such braking pressure is also communicated to the outward end face 118 of the piston 106 and the end face 102 of the spool 88 via passages 86 and 74 respectively. As illustrated in FIG. 3, the force exerted on the piston 106 and spool 88 by the braking pressure is effective in causing their respective inward movements until the stop member 104 of the spool 88 contacts the piston 106 and the piston 106 bottoms in its bore 62. The springs 110 and 114 are chosen so that such braking pressure will provide such movement of the piston 106 and spool 88.

When the piston 106 is so bottomed, a cavity or accumulator chamber 120 is defined in the bore 62 between the plug 66 and the end face 118 of the piston 106. Such cavity 120 is designed to hold a predetermined amount of fluid which will be utilized in the deactuation sequence to be hereinafter described.

The spool 88, when in its first position, has its recess 96 disposed in alignment with the intersection of the passage 76 with bore 58, so that fluid can be freely communicated between ports 68 and 72. This permits the operator to freely modulate the brake pressure in the normal braking pressure range without any restrictions.

Upon deactuation of the brake control valve 16, the pressure to the neutralizer valve 50 and the brake delay valve 10 at inlet port 68 is released, and quickly drops to tank pressure. The release of pressure supplied to the neutralizer valve 50 causes it to shift immediately to its "off" position, which stops the dumping of fluid to the transmission control valve 52 from the pump 54. This permits the transmission to begin reengagement.

However, the transmission requires a predetermined amount of time before becoming completely reengaged, which requires the delay in the release of the brakes 36, as described earlier.

Initially, with the spool 88 in its first position, relatively rapid release of pressure from the brakes 36 is allowed through passage 76 via recess 96. It will be noted that the release of pressure through passages 74 and 78 is substantially blocked by the check valves 80 and 84 respectively. Dropping from braking pressure to holding pressure, the pressure in the valve becomes equal to the force being exerted against the spool 88 by the force of the compressed springs 110 and 114. Consequently, the spool 88 begins moving outwardly in its bore 58 to a second position wherein the land 92 blocks the communication of fluid through passage 76. Because of its having a relatively greater surface area than the valve spool 88, the piston 106 remains bottomed in its bore during this initial movement of the spool 88.

With the spool 88 in its blocking or second position, fluid is prevented from escaping from the valve to tank except through the orifice 82 in the check valve 80. As noted earlier, the amount of fluid returned upon the deactuation of caliper type disc brakes is relatively small, which makes the metering of such fluid for delaying purposes extremely difficult and unreliable. This problem is overcome by the construction of the present invention which provides a known volume of fluid which is metered through a known size orifice at a known pressure to provide the desired period of time delay.

The known volume of fluid is contained in the accumulator chamber 120 and in the spool bore 58 outwardly from the end face 102 of the spool 88. This volume of fluid is slowly metered through the orifice 82 as the spool 88 moves when in the area of second position. During such subsequent movement of the spool 88, the piston 106 is adapted to move outwardly from its bottomed position to its farthest outward position against plug 66 by the force exerted thereon from springs 110 and 114.

After the desired time delay is achieved, communication is reestablished through passage 76 via annular recess 98. The reopening of the passage 76 quickly releases the remaining holding pressure and allows the spool 88 to extend rapidly to its third or farthest outward position, as shown in FIG. 2.

It should be noted that several modifications could be made to the particular embodiment shown and described therein without detracting from the desired performance of the valve 10. Firstly, the passage 78 and the check valve 84 could be eliminated without having a detrimental effect on the delaying function of the valve 10. The purpose of this passage 78 is to provide a more direct route through the valve 10 than provided by the passage 74 to permit a more instantaneous application of the brakes 36 during emergency situations. Secondly, the orifice 82 could be disposed in the check valve 84, rather than the check valve 80, or in any other convenient position in the valve body 56. In fact, it would be possible to provide the orifice 82 through the land 92 of the spool 88.

The chamber 120, it will be seen, acts as an accumulator to provide a predetermined volume of fluid which passes through orifice 82 for each actuation cycle of the valve 10, to supplement the fluid metered through the orifice 82 when the brakes 36 are released to provide a more reliable control of the delay of the release of the brakes 36.

What is claimed is:

1. A control device in combination with fluid pressure means for supplying fluid at increasing pressures to said device and releasing fluid at decreasing pressure from said device, and actuator means, said actuator means being responsive to application of fluid pressure thereto and said actuator means being responsive to release of fluid pressure therefrom, said device comprising:

a housing defining a valve bore in communication with said fluid pressure means and said actuator means;

an inlet check valve means for supplying pressure from said fluid pressure means to said actuator means;

a valve spool having a pressure responsive and force movable within said valve bore to a first position, a second position and a third position intermediate of said first and second positions, said valve spool having a first groove and a second groove for communicating fluid under pressure communicated to said valve bore to said actuator means while said valve spool is in its first and second positions respectively, and for releasing fluid under pressure from said actuator means to said fluid pressure means at a first release rate while said valve spool is in its first and second positions respectively, and said spool while in its third intermediate position blocking release of fluid under pressure at said first release rate from said actuator means to said fluid pressure means; and means acting in cooperation with said valve spool for providing release of pressure from said actuator means at a second release rate substantially less than said first release rate while said valve spool is in its third position, said means including a piston movable in said valve bore and resilient means between said piston and valve spool for resiliently urging said valve spool and said piston relatively apart;

and an orifice continuously communicating said actuator means, said valve spool end face, and said piston with said fluid pressure means;

said valve spool and said piston urged relatively together under the influence of fluid pressure communicated to said valve bore with said valve spool moving to said second position, so that upon release of said fluid under pressure by said fluid pressure means said valve spool is urged from its second position to its third position by said resilient means and with said valve spool in said third position said piston forces fluid through said orifice by the urging of said piston relatively away from said valve spool by said resilient means, whereby release of fluid pressure from said device is accomplished in a stepped manner.

* * * * *